Patented May 9, 1933

1,907,592

UNITED STATES PATENT OFFICE

WALTER SCHOELLER AND ERWIN SCHWENK, OF BERLIN-WESTEND, HANS GOEBEL, OF BERLIN-REINICKENDORF, AND SIEGFRIED MICHAEL, OF MUNICH, GERMANY, ASSIGNORS TO SCHERING-KAHLBAUM A. G., OF BERLIN, GERMANY

PHOSPHORIC ACID ESTER OF GLUCONIC ACID

No Drawing. Application filed August 17, 1932, Serial No. 629,128, and in Germany August 26, 1931.

Our invention refers to organic phosphoryl esters and more especially to phosphoryl esters of acids of the carbohydrate group.

It is an object of our invention to provide means whereby such esters, which are valuable as dietetics and for therapeutical purposes, can be produced in a simple and efficient manner.

The phosphorylation of carbohydrates has been effected by many chemists in view of the biological and technical interest involved, but hitherto no phosphorylation of the acids of the carbohydrate group has been described. While phosphoric acid esters of lower oxy-acids have been produced and in some cases also phosphoric acid esters of oxy-acids have been obtained by oxidation of the esters of the corresponding kinds of sugar, no direct phosphorylation of the poly-oxy-acids containing more than two oxy-groups has hitherto been disclosed.

We have now found that phosphorylation of gluconic acid $C_6H_5(OH)_5(COOH)$ can easily be effected by treating gluconic acid, preferably the pure crystalline modification, with phosphorylating agents.

Thus for instance, if gluconic acid is heated during about 48 hours with somewhat more than the calculated quantity of metaphosphoric acid ethyl ester, a satisfactory esterification will take place. On dissolution of the product of reaction in water and addition of calcium carbonate the calcium salt of gluconic acid-phosphoric acid is obtained. The other alkaline earth metal salts of this acid are obtained in a similar manner.

The same complex acid is obtained if gluconic acid is treated with phosphoric acid halides, preferably with phosphorus oxychloride in alkaline solution.

However the reaction with phosphoric acid halides appears to be less suitable for technical purposes, since in this reaction also halides of the alkaline earth metals are produced, which can be separated from the main product only with difficulty. In contradistinction thereto the reaction with phosphoric acid esters results in products free from halogen, which can easily be obtained in absolutely pure state.

In practicing our invention we may for instance proceed as follows:

Example 1

40 parts by weight calcium gluconate, to which has been added about the same quantity of calcium carbonate, are mixed with slightly more than the calculated quantity of an organic ester of phosphoric acid, for instance with 25 parts of the product of reaction between ether and phosphorus pentoxide. By thorough trituration and subsequent heating the constituents of the mixture are induced to react with each other. After about 5 hours when the reaction has come to an end, the product is dissolved in boiled water and by stirring during several hours complete neutralization of the product of reaction is effected. If the quantity of calcium carbonate added at the beginning should not suffice, milk of lime is added until the first signs of a reaction with phenolphthalein are observed. After short boiling the suspension is allowed to stand 24 hours and thereafter filtered. The clear filtrate thus obtained is evaporated to dryness in vacuo.

The compound thus obtained contains about 20.5% $P_2O_5$. The yield is 60 parts of a fine white powder, which dissolves in water with the greatest readiness and without any turbidity. This solution is adapted to be sterilized.

Example 2

40 parts calcium gluconate are suspended in 100 parts alcohol and 14 parts $P_2O_5$ are added in small portions. On heating under stirring on the water bath the mass is converted into a slimy broth. After the reaction has come to an end the alcohol is distilled off, the residue is dissolved in boiled water and the solution rendered weakly alkaline with milk of lime and treated further as described with reference to example 1.

40 parts calcium gluconate may be replaced in an analogous manner by the corresponding quantity of free gluconic acid.

Example 3

1 kilogram crystallized pulverulent gluconic acid is well mixed with 1,5 kilograms metaphosphoric acid ethyl ester and the mixture heated during 48 hours on the water bath under repeated stirring. The yellow mass after being cooled down is dissolved in water and rendered alkaline with milk of lime, whereupon about 10 litres water are added, the whole heated to boiling and the solution separated from the residue. By treating this solution with carbonic acid calcium carbonate is precipitated which is separated by filtration. The filtrate which may be discolored with carbon, is evaporated to dryness in vacuo.

Example 4

1 kilogram calcium gluconate is suspended in 1 litre water and a solution of 300 grams phosphorus oxychloride in 600 ccms chloroform is added drop by drop under stirring and cooling, milk of lime being at the same time added in such proportion that the mixture always shows an alkaline reaction. After standing overnight and adding 4 litres water the whole is heated to boiling, whereupon the solution is separated from the residue and is freed from the calcium in excess and evaporated to dryness in vacuo, as described with reference to Example 1. The dry pulverulent residue is well triturated with alcohol and the alcoholic solution separated. The residue corresponds to the compound obtained according to Example 3.

The free gluconic acid-phosphoric acid is obtained in the form of a syrup readily soluble in water, from which salts can easily be produced in a well known manner.

The compound possesses the important property of being completely decomposed by the enzymes of vegetable and animal organisms, for instance by aspergillus niger-phosphatase, by takadiastase, by yeast-phosphatase and by the enzymes of the animal digestive tract into gluconic acid and phosphoric acid. This property renders the gluconic acid-phosphoric acid useful for therapeutical and dietetical purposes, while the calcium salt, which is readily soluble in water, can be used with advantage in administering calcium per os or by intravenous injection. These injections are not accompanied by any inconvenient phenomena.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of producing a phosphoric acid ester of gluconic acid comprising acting on a compound of the group formed by gluconic acid and the salts of this acid with a phosphorylating agent.

2. The method of producing a phosphoric acid ester of gluconic acid comprising acting on a compound of the group formed by gluconic acid and the salts of this acid with an ester of phosphoric acid.

3. The method of producing a phosphoric acid ester of gluconic acid comprising acting on a compound of the group formed by gluconic acid and the salts of this acid with metaphosphoric acid ethyl ester.

4. The method of producing a phosphoric acid ester of gluconic acid comprising acting on a compound of the group formed by gluconic acid and the salts of this acid with phosphorus oxychloride.

In testimony whereof we affix our signatures.

WALTER SCHOELLER.
ERWIN SCHWENK.
HANS GOEBEL.
SIEGFRIED MICHAEL.